United States Patent
Oe et al.

(10) Patent No.: US 8,965,556 B2
(45) Date of Patent: Feb. 24, 2015

(54) ROBOT SYSTEM

(75) Inventors: Yuki Oe, Kitakyushu (JP); Keiji Makino, Kitakyushu (JP)

(73) Assignee: Kabushiki Kaisha Yaskawa Denki, Kitakyushu-shi (JP)

(*) Notice: Subject to any disclaimer, the term of this patent is extended or adjusted under 35 U.S.C. 154(b) by 307 days.

(21) Appl. No.: 13/371,474

(22) Filed: Feb. 13, 2012

(65) Prior Publication Data
US 2012/0255937 A1    Oct. 11, 2012

(30) Foreign Application Priority Data

Apr. 8, 2011 (JP) ................. 2011-086207

(51) Int. Cl.
*B23K 26/08* (2014.01)
*B23K 26/10* (2006.01)
*B23K 26/20* (2014.01)
*B23K 26/30* (2014.01)

(52) U.S. Cl.
CPC ............. *B23K 26/0884* (2013.01); *B23K 26/08* (2013.01); *B23K 26/0807* (2013.01); *B23K 26/10* (2013.01); *B23K 26/20* (2013.01); *B23K 26/422* (2013.01); *B23K 2201/18* (2013.01)
USPC .................. 700/166; 219/121.63; 219/121.78; 219/121.79; 372/24

(58) Field of Classification Search
CPC ........ B23K 26/00; B23K 26/04; B23K 26/08; B23K 26/20; G05B 11/00; G06F 19/00; G06F 19/28
USPC ............ 219/121.63, 121.64, 121.78, 121.81, 219/121.82, 121.83, 166, 245, 250; 700/166, 245, 250; 250/559.29, 250/559.33; 382/153; 372/24
See application file for complete search history.

(56) References Cited

U.S. PATENT DOCUMENTS

| | | | | |
|---|---|---|---|---|
| 4,907,169 A | * | 3/1990 | Lovoi | 700/259 |
| 4,969,108 A | * | 11/1990 | Webb et al. | 700/259 |
| 5,665,255 A | | 9/1997 | Busuttil | |
| 6,747,241 B2 | | 6/2004 | Shikoda et al. | |
| 8,103,381 B2 | | 1/2012 | Fukawa | |
| 8,168,919 B2 | * | 5/2012 | Hamaguchi et al. | 219/121.63 |
| 8,509,941 B2 | * | 8/2013 | Regaard et al. | 700/193 |
| 2007/0193984 A1 | | 8/2007 | Kawai et al. | |
| 2009/0078687 A1 | | 3/2009 | Idaka et al. | |

FOREIGN PATENT DOCUMENTS

| | | |
|---|---|---|
| CN | 1817547 | 8/2006 |
| JP | 10-071480 | 3/1998 |

(Continued)

OTHER PUBLICATIONS

Japanese Office Action for corresponding JP Application No. 2011-086135, Apr. 16, 2013.
Japanese Office Action for corresponding JP Application No. 2011-086207, Apr. 16, 2013.

(Continued)

*Primary Examiner* — Samuel M Heinrich
(74) *Attorney, Agent, or Firm* — Mori & Ward, LLP

(57) ABSTRACT

This robot system includes a robot, a laser emitting portion moved by the robot, capable of scanning a welding locus with a laser beam at least in a state where the laser emitting portion is not moving, and a control portion controlling the laser emitting portion to scan the welding locus with the laser beam in order to perform welding with weaving on the welding locus at least in the state where the laser emitting portion is not moving.

19 Claims, 9 Drawing Sheets

(56) References Cited

FOREIGN PATENT DOCUMENTS

| JP | 2002-137083 | 5/2002 |
|----|-------------|--------|
| JP | 2002-192378 | 7/2002 |
| JP | 2007-098464 | 4/2007 |
| JP | 2009-078280 | 4/2009 |
| KR | 20110029344 | 3/2011 |

OTHER PUBLICATIONS

European Office Action for corresponding EP Application No. 12 155 735.9-1702, Oct. 8, 2013.
Extended European Search Report for corresponding EP Application No. 12155735, Jul. 20, 2012.
Chinese Office Action for corresponding CN Application No. 201210050199.X, Jul. 29, 2014.

* cited by examiner

| LASER WELDING CONDITION FILE #1 | | |
|---|---|---|
| INTERPOLATION TYPE | STRAIGHT-LINE INTERPOLATION | |
| LASER OUTPUT | 1000 | W |
| WELDING SPEED | 500 | cm/min |
| X-AXIS RADIUS | 4 | mm |
| Y-AXIS RADIUS | 2 | mm |
| FREQUENCY | 20 | Hz |

311

ROBOT SYSTEM

CROSS-REFERENCE TO RELATED APPLICATIONS

The priority application number JP2011-86207, Robot System, Apr. 8, 2011, Yuki Oe, Keiji Makino, upon which this patent application is based, is hereby incorporated by reference.

BACKGROUND OF THE INVENTION

1. Field of the Invention

The present invention relates to a robot system.

2. Description of the Background Art

A laser emitting portion capable of emitting a laser beam to a welding locus is known in general, as disclosed in Japanese Patent Laying-Open No. 2002-137083, for example.

The aforementioned Japanese Patent Laying-Open No. 2002-137083 discloses a laser machining head (laser emitting portion) capable of emitting a laser beam to a welding locus. This laser machining head is formed to perform weaving on the welding locus by driving a beam weaving device provided inside while moving along the welding locus.

SUMMARY OF THE INVENTION

A robot system according to an aspect of the present invention includes a robot, a laser emitting portion moved by the robot, capable of scanning a welding locus with a laser beam at least in a state where the laser emitting portion is not moving, and a control portion controlling the laser emitting portion to scan the welding locus with the laser beam in order to perform welding with weaving on the welding locus at least in the state where the laser emitting portion is not moving.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

Figure 2:
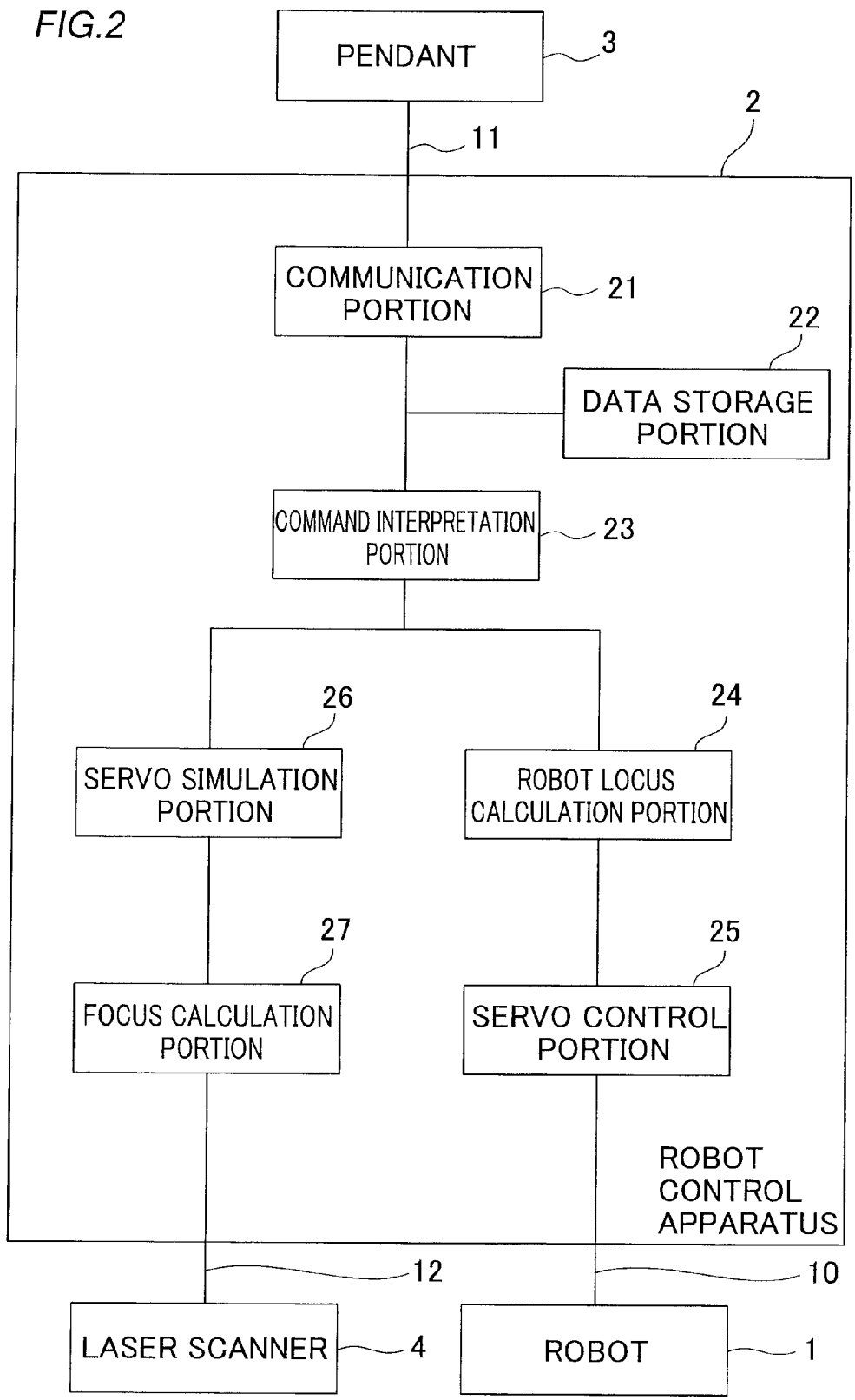
FIG. 2 is a block diagram showing a robot control apparatus of the robot system according to the embodiment of the present invention.
Figure 3:
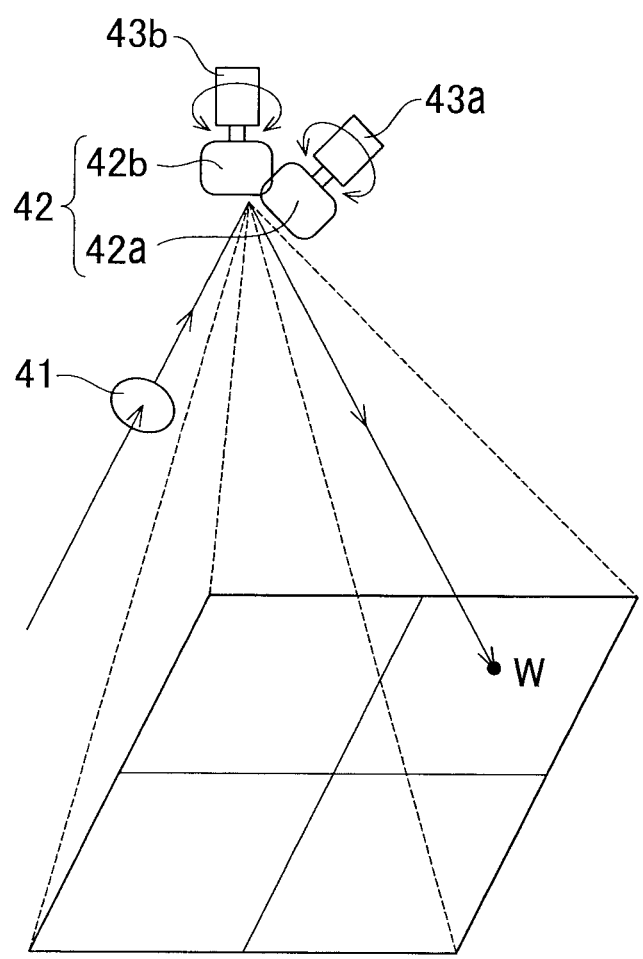
FIG. 3 is a schematic diagram showing the structure of a laser scanner of the robot system according to the embodiment of the present invention.

First, the structure of a robot system 100 according to the embodiment of the present invention is described with reference to FIGS. 1 to 3.

The robot system 100 according to the embodiment of the present invention is a robot system for remote laser welding emitting a laser beam from a position spaced (position spaced about 500 mm, for example) from an object to perform laser welding. In the robot system 100 according to this embodiment, a user can select welding performed by scanning a welding locus with a laser beam while performing substantially circular or substantially elliptic weaving continued on the welding locus (welding with weaving) or welding performed by scanning the welding locus with a laser beam without weaving (welding without weaving). The robot system 100 includes a robot 1, a robot control apparatus 2 controlling the robot 1, and a pendant (programming pendant) 3 to teach operations of the robot 1, as shown in FIG. 1. The robot system 100 according to this embodiment further includes a laser scanner 4 scanning the welding locus with a laser beam, mounted on the robot 1 and a laser oscillator 5 supplying a laser beam to the laser scanner 4. The pendant 3 is examples of the "acceptance portion" and the "teaching apparatus" in the present invention, and the laser scanner 4 is an example of the "laser emitting portion" in the present invention.

The robot 1 is a multi-joint type robot having a plurality of joints. The robot 1 includes a plurality of servomotors (not shown) to drive each joint, and the laser scanner 4 mounted on an end portion of the robot can be moved by each servomotor.

Figure 1:
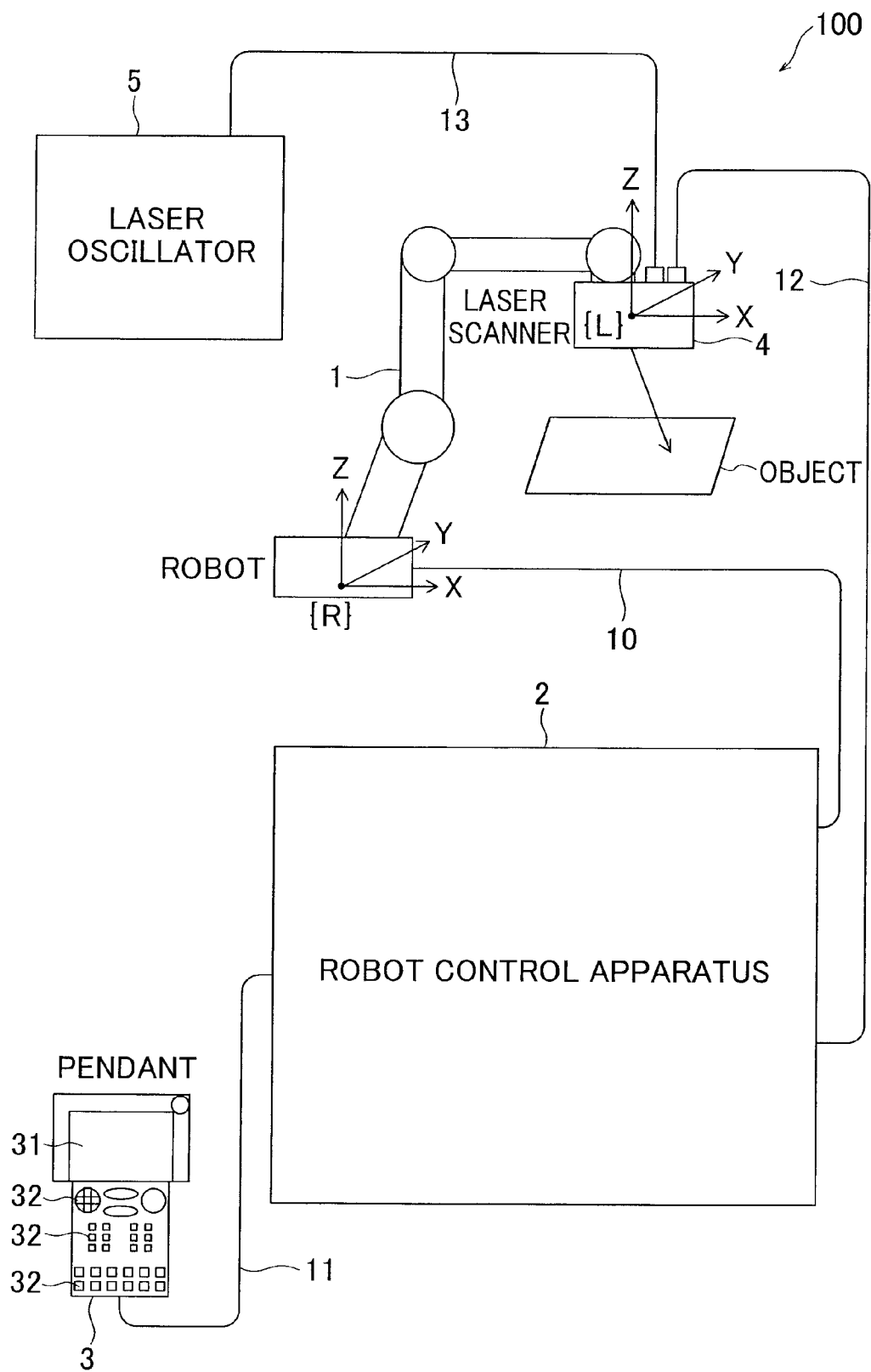
FIG. 1 is a schematic diagram showing the overall structure of a robot system according to an embodiment of the present invention.

The robot control apparatus 2 is connected to the robot 1 through a robot instruction cable 10 to be capable of communication, as shown in FIG. 1. The robot control apparatus 2 is also connected to the pendant 3 through a cable 11 to be capable of communication. The robot control apparatus 2 is also connected to the laser scanner 4 through a scanner instruction cable 12 to be capable of communication. The robot control apparatus 2 includes a communication portion 21 transmitting a signal to and receiving a signal from the pendant 3, a data storage portion 22 storing an operation program, welding information regarding laser welding (information regarding a welding speed, a welding locus, and the shape of a weaving locus), etc., and a command interpretation portion 23 retrieving the operation program, the welding information, etc. stored in the data storage portion 22 to interpret the information, as shown in FIG. 2.

The robot control apparatus 2 further includes a robot locus calculation portion 24 calculating a movement locus of the robot 1 at every prescribed control cycle on the basis of the interpretation of the command interpretation portion 23 and a servo control portion 25 controlling each servomotor provided in the robot 1 on the basis of the calculation result by the robot locus calculation portion 24. The robot control apparatus 2 is provided with a servo simulation portion 26 presuming a current state of the end portion of the robot 1 (current position and posture of the laser scanner 4) on the basis of an operation instruction transmitted from the servo control portion 25 to each servomotor and a focus calculation portion 27 calculating a focal position (welding position) on the basis of the current position of the end portion of the robot 1 presumed by the servo simulation portion 26. There is a slight time lag between the timing to transmit the operation instruction from the servo control portion 25 and the timing to operate the robot 1 on the basis of the operation instruction. Consequently, the servo simulation portion 26 presumes the current position and posture of the laser scanner 4 in consideration of the time lag. Processing for welding with weaving performed by the focus calculation portion 27 will be described later. The focus calculation portion 27 is an example of the "control portion" in the present invention.

The pendant 3 is provided to prepare the operation program of the robot 1 and the welding information regarding laser welding (information regarding a welding speed, a welding locus, and the shape of a weaving locus). The pendant 3 has a display portion 31 and an operation portion 32 including a plurality of operation buttons, as shown in FIG. 1. The user can input prescribed information by operating the operation portion 32, viewing display on the display portion 31. The user can teach the operations of the robot 1 to the robot control apparatus 2 by operating the pendant 3.

The laser scanner 4 has a function of emitting a laser beam output from the laser oscillator 5 to the object. The laser beam output from the laser oscillator 5 is supplied to the laser scanner 4 through a fiber 13. As shown in FIG. 3, an optical system 41 constituted by a lens, etc., a galvanometer mirror 42 including mirrors 42a and 42b, and motors 43a and 43b driving the mirrors 42a and 42b, respectively, are provided inside the laser scanner 4. The laser beam supplied from the laser oscillator 5 to the laser scanner 4 is condensed by the optical system 41, and thereafter the direction of the laser beam is changed by the galvanometer mirror 42, so that the laser beam is emitted to the object. The laser scanner 4 is formed to scan a prescribed position with a laser beam by driving the mirrors 42a and 42b on the basis of the calculation result by the focus calculation portion 27. Thus, the laser scanner 4 can scan the welding locus with a laser beam by the galvanometer mirror 42 both in a state where the laser scanner 4 is not moving and a state where the laser scanner 4 is moving. Specifically, the laser scanner 4 according to this embodiment can emit a laser beam within a range of 200 mm square in a state spaced 500 mm from the object. Thus, the specification of the laser scanner 4 such as a laser focal distance is previously known, and hence it is presumed that a distance from the laser scanner 4 to the object is the laser focal distance at the time of preparation of the welding locus described later. Furthermore, the distance from the laser scanner 4 to the object is maintained at the laser focal distance when teaching the operations of the robot 1 or performing laser welding. The laser scanner 4 also includes an adjustment mechanism of the optical system 41 omitted in FIG. 3, and hence the laser scanner 4 can dynamically change the laser focal distance. Thus, the robot system 100 can perform laser welding, changing the distance from the laser scanner 4 to the object. The galvanometer mirror 42 and the mirrors 42a and 42b are examples of the "mirror portion" in the present invention.

Next, a preparation procedure prior to welding is described with reference to FIGS. 1, 4, and 5.

First, the user teaches the operations of the robot 1 to the robot control apparatus 2 while moving the robot 1 with the pendant 3. Furthermore, the user sets a section where welding is performed (welding section) with the pendant 3. Furthermore, the user selects either the welding with weaving or the welding without weaving. Furthermore, the user sets the welding information regarding laser welding (information regarding a welding speed, a welding locus, and the shape of a weaving locus). Specifically, if the welding with weaving is selected, the user selects an interpolation type on a laser welding condition file screen 311 displayed on the display portion 31 (see FIG. 1) of the pendant 3, as shown in FIG. 4. The "interpolation type" denotes one of control parameters for specifying how an operation locus (welding locus) of the end portion (laser scanner 4) of the robot 1 should be when the end portion of the robot 1 is moved between a starting point and an end point taught to the robot 1. The interpolation type includes straight-line interpolation, circular interpolation, elliptic interpolation, and arbitrary shape, and is selected in response to the shape of a desired welding locus. Furthermore, the user sets a value of laser output and a welding speed on the laser welding condition file screen 311. The welding speed denotes a speed at which the center point of a substantially circular or substantially elliptic weaving locus moves on the welding locus when the welding with weaving is performed, and the welding speed denotes a speed at which a welding point (focus) to which a laser beam is emitted moves on the welding locus when the welding without weaving is performed. Furthermore, the use sets an X-axis radius and a Y-axis radius that is orthogonal to the X-axis radius, of the substantially circular or substantially elliptic weaving locus. Furthermore, the user sets the frequency of substantially circular or substantially elliptic weaving motion. In this case, an X-axis is a direction from a starting point Ws of the welding locus toward an end point We described later, and a Y-axis is a direction orthogonal to the X-axis on a work area 200 of the object described later.

Figures 4, 5:
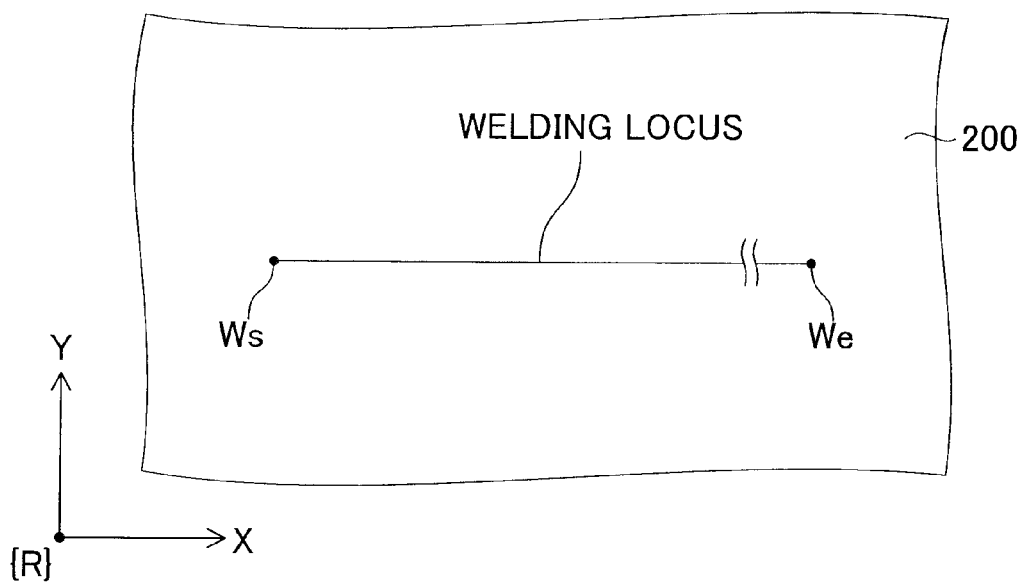
FIG. 4 is a diagram showing a laser welding condition file screen of the robot system according to the embodiment of the present invention.
FIG. 5 is a diagram for illustrating an operation procedure for teaching a starting point serving as a reference position of a welding locus and an end point in the robot system according to the embodiment of the present invention.

The user teaches the starting point Ws serving as a reference position of the welding locus and the end point We of the welding locus in the work area 200 of the object to the robot control apparatus 2, as shown in FIG. 5, while moving the robot 1 with the pendant 3. Specifically, the user moves the robot 1 to emit a laser beam for teaching from the laser scanner 4, and teaches the starting point Ws serving as the reference position to the robot control apparatus 2 at a desired position while confirming the position of the laser beam on the work area 200. Thus, a position $^{R}Ws$ of the starting point Ws as viewed from a robot coordinate system $\{R\}$ fixed to a setting portion of the robot 1 is taught. Similarly to the case of the starting point Ws, the user moves the robot 1 to emit a laser beam for teaching from the laser scanner 4, and teaches the end point We to the robot control apparatus 2 while confirming the position of the laser beam on the work area 200. Thus, a position $^{R}We$ of the end point We as viewed from the robot coordinate system $\{R\}$ is taught. Thus, a welding locus from the starting point Ws to the end point We is set in the shape of the interpolation type selected on the laser welding condition file screen 311 in FIG. 4. If the straight-line interpolation is selected as the interpolation type, a welding locus linearly connecting the starting point Ws and the end point We is set, as shown in FIG. 5. A section from the starting point Ws to the end point We is the welding section. The robot coordinate system {R} is an example of the "first coordinate system" in the present invention.

Next, the processing for welding with weaving performed by the focus calculation portion 27 of the robot system 100 according to this embodiment is described with reference to FIGS. 4 and 6 to 12.

Figure 6:
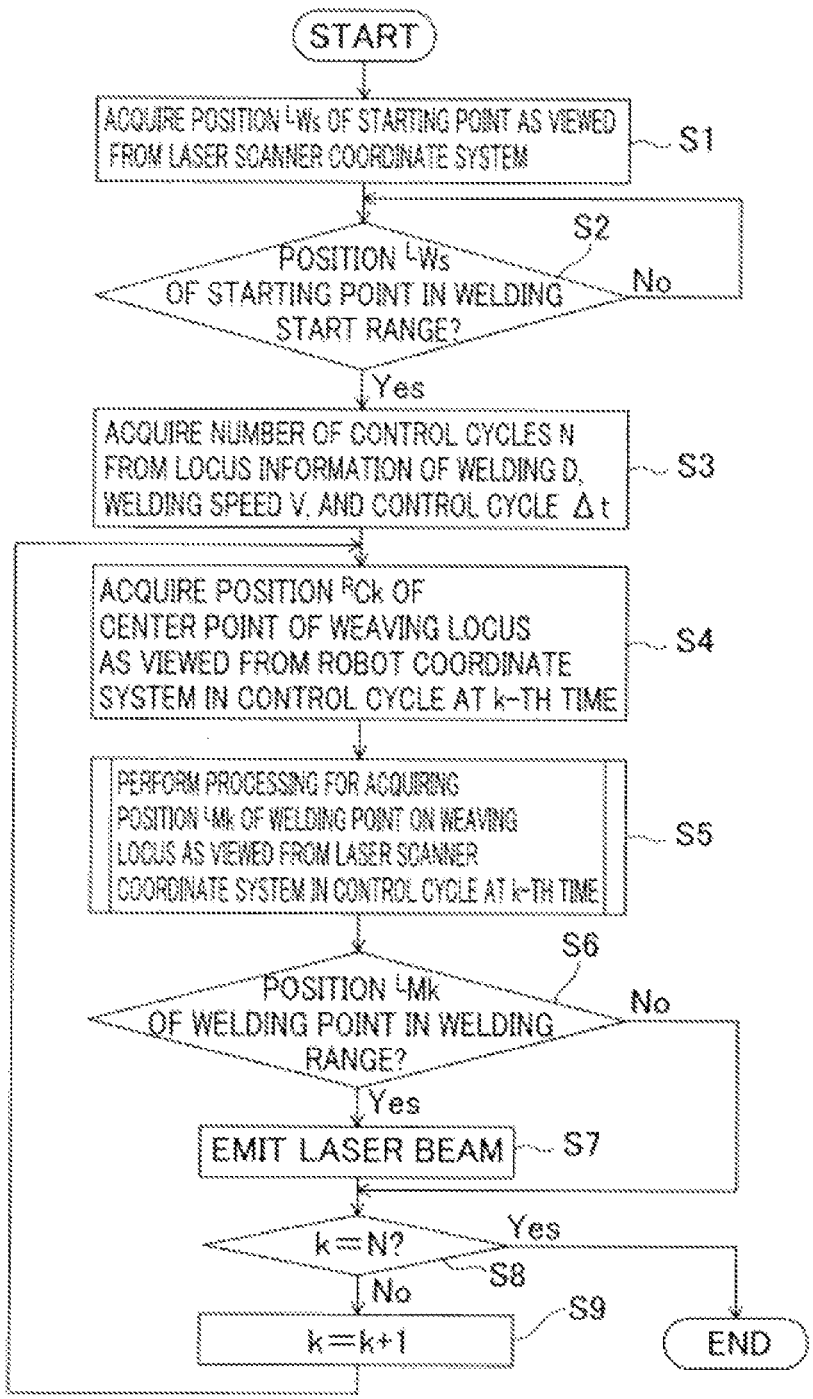
FIG. 6 is a flowchart for illustrating processing for welding with weaving by a focus calculation portion of the robot system according to the embodiment of the present invention.

At a step S1 in FIG. 6, the focus calculation portion 27 acquires a position $^L$Ws of the starting point Ws (see FIG. 5) as viewed from a laser scanner coordinate system {L} fixed to the laser scanner 4. Specifically, the focus calculation portion 27 acquires the position $^L$Ws of the starting point Ws as viewed from the laser scanner coordinate system {L} on the basis of a current position and posture $^R_L$T of the laser scanner 4 as viewed from the robot coordinate system {R} presumed by the servo simulation portion 26 and the taught position $^R$Ws of the starting point Ws as viewed from the robot coordinate system {R}. The laser scanner coordinate system {L} is an example of the "second coordinate system" in the present invention.

An expression for obtaining the position $^L$Ws of the starting point Ws as viewed from the laser scanner coordinate system {L} is shown as the following expression (1).

$$^LWS(X_{Ws}, Y_{Ws}) = (^R_LT)^{-1} \cdot {^RWs} \tag{1}$$

In the aforementioned expression (1), $^L$Ws represents the position of the starting point Ws as viewed from the laser scanner coordinate system {L}, $X_{Ws}$ represents the X-coordinate of the position $^L$Ws of the starting point Ws as viewed from the laser scanner coordinate system {L}, $Y_{Ws}$ represents the Y-coordinate of the position $^L$Ws of the starting point Ws as viewed from the laser scanner coordinate system {L}, $^R_L$T represents the current position and posture of the laser scanner 4 as viewed from the robot coordinate system {R} presumed by the servo simulation portion 26, and $^R$Ws represents the position of the starting point Ws as viewed from the robot coordinate system {R}. $(^R_LT)^{-1}$ denotes inverse transform of $^R_L$T, and represents the current position and posture of the origin of the robot coordinate system {R} as viewed from the laser scanner coordinate system {L}.

Figure 7:
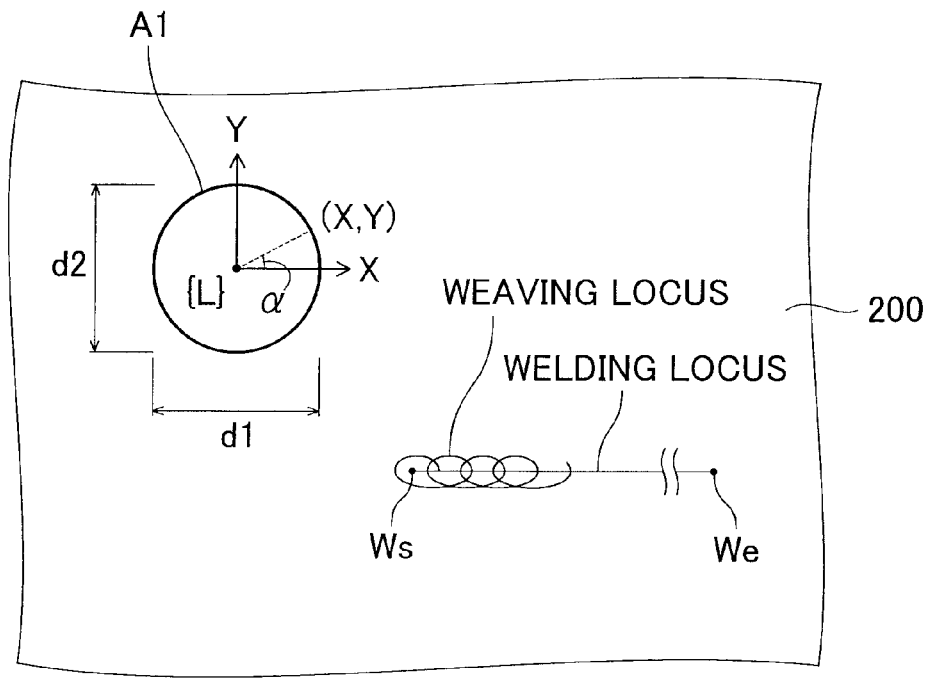
FIG. 7 is a diagram showing a welding start range of the robot system according to the embodiment of the present invention.

The focus calculation portion 27 determines whether or not the position $^L$Ws of the starting point Ws is in a welding start range A1 (see FIGS. 7 and 8) at a step S2. The user sets values of an X-axis diameter d1 and a Y-axis diameter d2 of a circle or an ellipse centered around the origin of the laser scanner coordinate system {L} to determine the welding start range A1, as shown in FIG. 7. The user can freely set the X-axis diameter d1 and the Y-axis diameter d2. However, if too large diameters are set as the X-axis diameter d1 and the Y-axis diameter d2, a laser beam is emitted to a great distance from the laser scanner 4, and hence a maximum settable value of each diameter is set to 200 mm. In this embodiment, the X-axis diameter d1 and the Y-axis diameter d2 both are set to 180 mm, for example. The X-axis diameter d1 and the Y-axis diameter d2 may be equal to or different from each other. In other words, the welding start range A1 is set to be substantially circular or substantially elliptic. The welding start range A1 is moved in association with movement of the laser scanner 4 by the robot 1.

Next, an expression for determining whether or not the position $^L$Ws of the starting point Ws is in the welding start range A1 is shown as the following expression (2-5). The expressions (2-1) to (2-4) are for describing a procedure for calculating the expression (2-5).

First, an X-coordinate and a Y-coordinate located in the welding start range A1 shown in FIG. 7 are defined by the following expressions (2-1) and (2-2).

$$|X| \le |d1/2 \times \cos(\alpha)| \tag{2-1}$$

$$|Y| \le |d2/2 \times \sin(\alpha)| \tag{2-2}$$

These expressions are transformed to obtain the following expressions (2-3) and (2-4).

$$4X^2/d1^2 \le \cos^2(\alpha) \tag{2-3}$$

$$4Y^2/d2^2 \le \sin^2(\alpha) \tag{2-4}$$

Then, the expression (2-5) to be satisfactory in a case where the position $^L$Ms of the starting point Ws is located in the welding start range A1 is obtained from the aforementioned expressions (2-3) and (2-4).

$$4(X_{Ws}^2/d1^2 + Y_{Ws}^2/d2^2) \le 1 \tag{2-5}$$

In the aforementioned expression (2-5), $X_{Ws}$ represents the X-coordinate of the position $^L$Ws of the starting point Ws as viewed from the laser scanner coordinate system {L}, $Y_{Ws}$ represents the Y-coordinate of the position $^L$Ws of the starting point Ws as viewed from the laser scanner coordinate system {L}, d1 represents the X-axis diameter of the welding start range A1, and d2 represents the Y-axis diameter of the welding start range A1.

Figure 8:
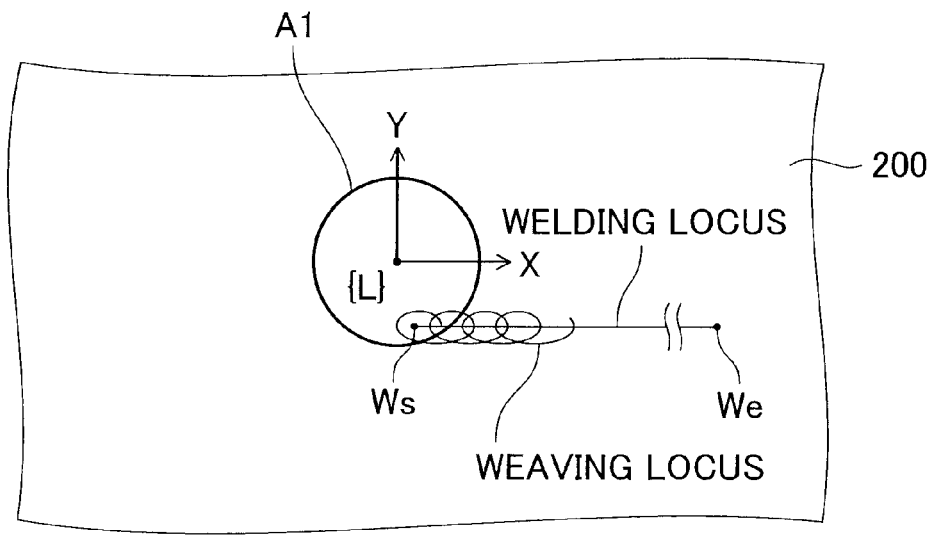
FIG. 8 is a diagram showing a state where the starting point of the welding locus is in the welding start range of the robot system according to the embodiment of the present invention.

The focus calculation portion 27 repeats this determination until the position $^L$Ws of the starting point Ws enters the welding start range A1. As shown in FIG. 8, the focus calculation portion 27 acquires the number of control cycles N in the welding section on the basis of the welding information (information regarding a welding speed and a welding locus) at a step S3 when the position $^L$Ws of the starting point Ws enters the welding start range A1. Specifically, the focus calculation portion 27 calculates the number of control cycles N on the basis of locus information of welding D, a welding speed V, and a control cycle of the robot 1 Δt. The locus information of welding D is based on the welding information (information regarding a welding speed and a welding locus) set with the pendant 3, and is information regarding the shape of a welding locus including the size (length) of a locus, the direction of a locus, etc. The welding speed V is a welding speed set on the laser welding condition file screen 311 shown in FIG. 4. At this stage, "0 (zero)" is assigned to a variable k described later for initialization.

Next, an expression for acquiring the number of control cycles N in the welding section is shown as the following expression (3).

$$N = D/(V \times \Delta t) \tag{3}$$

In the aforementioned expression (3), N represents the number of control cycles in the welding section (integer of at least 0), D represents the locus information of welding (length of a welding locus in this case), V represents the welding speed, and Δt represents the control cycle. If the right side of the expression (3) cannot be divided, N is set to a value obtained by discarding all digits to the right of the decimal point of D/(V×Δt).

Then, the focus calculation portion 27 acquires a position $^R$Ck of the center point of the weaving locus as viewed from the robot coordinate system {R} in the control cycle at k-th time in the welding section at a step S4. Here, k is an integer (where 0≤k≤N). According to this embodiment, the focus calculation portion 27 causes the center point of the weaving locus to move on the welding locus at the set welding speed.

Next, an expression for acquiring the position $^R$Ck of the center point of the weaving locus as viewed from the robot coordinate system {R} in the control cycle at k-th time is shown as the following expression (4).

$$^R C_k = {}^R W_s + D(k/N) \qquad (4)$$

In the aforementioned expression (4), $^R C_k$ represents the position of the center point of the weaving locus as viewed from the robot coordinate system {R} in the control cycle at k-th time, $^R W_s$ represents the position of the starting point Ws as viewed from the robot coordinate system {R}, D represents the locus information of welding (length of a welding locus in this case), and N represents the number of control cycles in the welding section.

At a step S5, the focus calculation portion 27 performs processing for acquiring a position $^L M_k$ of a welding point Mk on the weaving locus as viewed from the laser scanner coordinate system {L} in the control cycle at k-th time.

Next, the processing for acquiring the position $^L M_k$ of the welding point Mk performed by the focus calculation portion 27 of the robot system 100 according to this embodiment is described with reference to FIGS. 9 and 10.

Figure 9:
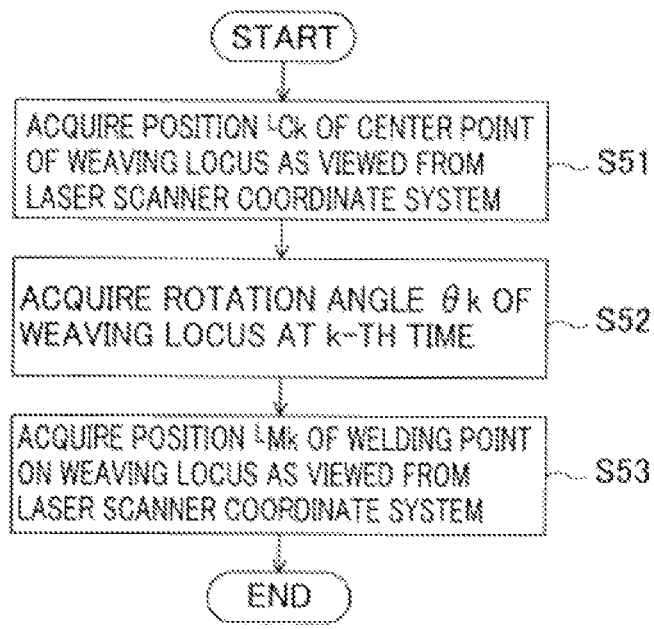
FIG. 9 is a flowchart for illustrating processing for acquiring a position of a welding point by the focus calculation portion of the robot system according to the embodiment of the present invention.
Figure 10:
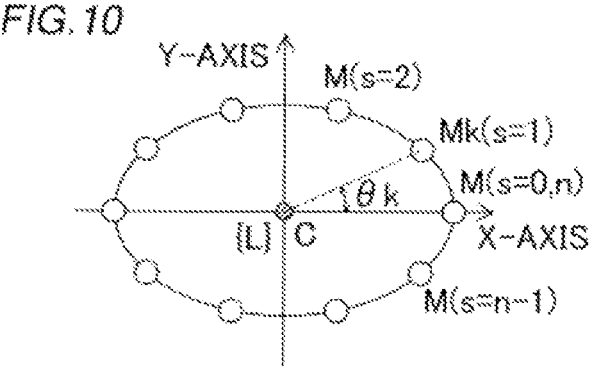
FIG. 10 is a diagram for illustrating a rotation angle of the welding point of the robot system according to the embodiment of the present invention.

At a step S51 in FIG. 9, the focus calculation portion 27 acquires a position $^L C_k$ of the center point of the weaving locus as viewed from the laser scanner coordinate system {L} in the control cycle at k-th time. Specifically, the focus calculation portion 27 acquires the position $^L C_k$ of the center point of the weaving locus as viewed from the laser scanner coordinate system {L} in the control cycle at k-th time on the basis of the current position and posture $^R_L T$ of the laser scanner 4 as viewed from the robot coordinate system {R} presumed by the servo simulation portion 26 and the position $^R C_k$ of the center point of the weaving locus as viewed from the robot coordinate system {R} in the control cycle at k-th time acquired at the step S4.

Next, an expression for obtaining the position $^L C_k$ of the center point of the weaving locus as viewed from the laser scanner coordinate system {L} in the control cycle at k-th time is shown as the following expression (5).

$$^L C_k(X_{Ck}, Y_{Ck}) = ({}^R_L T)^{-1} \cdot {}^R C_k \qquad (5)$$

In the aforementioned expression (5), $^L C_k$ represents the position of the center point of the weaving locus as viewed from the laser scanner coordinate system {L} in the control cycle at k-th time, $X_{Ck}$ represents the X-coordinate of the position $^L C_k$ of the center point of the weaving locus as viewed from the laser scanner coordinate system {L} in the control cycle at k-th time, $Y_{Ck}$ represents the Y-coordinate of the position $^L C_k$ of the center point of the weaving locus as viewed from the laser scanner coordinate system {L} in the control cycle at k-th time, $^R_L T$ represents the current position and posture of the laser scanner 4 as viewed from the robot coordinate system {R} presumed by the servo simulation portion 26, and $^R C_k$ represents the position of the center point of the weaving locus as viewed from the robot coordinate system {R} in the control cycle at k-th time. $({}^R_L T)^{-1}$ denotes inverse transform of $^R_L T$, and represents the current position and posture of the origin of the robot coordinate system {R} as viewed from the laser scanner coordinate system {L}.

Thereafter, at a step S52, the focus calculation portion 27 acquires a rotation angle θk of the substantially circular or substantially elliptic weaving locus in the control cycle at k-th time. Assuming that the center point of the weaving locus is not moving, the weaving locus is a circle or an ellipse centered around a point C corresponding to the center point of the weaving locus, having the X-axis radius and the Y-axis radius set on the laser welding condition file screen 311 (see FIG. 4), as shown in FIG. 10. The rotation angle θk of the welding point Mk in the control cycle at k-th time located on this circular or elliptic weaving locus is determined on the basis of the frequency of the weaving motion set on the laser welding condition file screen 311 (see FIG. 4) and the control cycle. Specifically, the focus calculation portion 27 acquires the number n of welding points on the weaving locus per cycle of the weaving motion on the basis of the frequency of the weaving motion and the control cycle. Then, the focus calculation portion 27 acquires the rotation angle θk of the welding point Mk in the control cycle at k-th time on the basis of the number n of welding points on the weaving locus per cycle of the weaving motion.

Next, an expression for acquiring the number n of welding points on the weaving locus per cycle of the weaving motion is shown as the following expression (6).

$$n = 1/(f \times \Delta t) \qquad (6)$$

In the aforementioned expression (6), n represents the number of welding points on the weaving locus per cycle of the weaving motion (integer of at least 0), f represents the frequency of the weaving motion, and Δt represents the control cycle. If the right side of the expression (6) cannot be divided, n is set to a value obtained by discarding all digits to the right of the decimal point of $1/(f \times \Delta t)$.

Next, an expression for acquiring the rotation angle θk of the welding point Mk in the control cycle at k-th time is shown as the following expression (7).

$$\theta k = 2\pi \times (s/n) \qquad (7)$$

In the aforementioned expression (7), θk represents the rotation angle of the welding point Mk in the control cycle at k-th time, s represents an integer (where 0≤s≤n), and n represents the number of welding points on the weaving locus per cycle of the weaving motion.

At a step S53, the focus calculation portion 27 acquires the position $^L M_k$ of the welding point Mk on the weaving locus as viewed from the laser scanner coordinate system {L} in the control cycle at k-th time. Actually, the center point of the weaving locus moves on the welding locus, and hence the focus calculation portion 27 acquires the position $^L M_k$ ($X_{Mk}$, $Y_{Mk}$) of the welding point Mk on the weaving locus in the control cycle at k-th time in consideration of the movement of the center point of the weaving locus.

Next, an expression for acquiring an X-coordinate $X_{Mk}$ of the position $^L M_k$ of the welding point Mk on the weaving locus as viewed from the laser scanner coordinate system {L} in the control cycle at k-th time is shown as the following expression (8), and an expression for acquiring a Y-coordinate $Y_{Mk}$ of the position $^L M_k$ of the welding point Mk on the weaving locus as viewed from the laser scanner coordinate system {L} in the control cycle at k-th time is shown as the following expression (9).

$$X_{Mk} = X_{Ck} + r1 \times \cos(\theta k) \qquad (8)$$

$$Y_{Mk} = Y_{Ck} + r2 \times \sin(\theta k) \qquad (9)$$

In the aforementioned expressions (8) and (9), $X_{Mk}$ represents the X-coordinate of the position $^L M_k$ of the welding point Mk on the weaving locus as viewed from the laser scanner coordinate system {L} in the control cycle at k-th time, $X_{Ck}$ represents the X-coordinate of the position $^L C_k$ of the center point of the weaving locus as viewed from the laser scanner coordinate system {L} in the control cycle at k-th time, $Y_{Mk}$ represents the Y-coordinate of the position $^L M_k$ of the welding point Mk on the weaving locus as viewed from the laser scanner coordinate system {L} in the control cycle at k-th time, $Y_{Ck}$ represents the Y-coordinate of the position $^L C_k$ of the center point of the weaving locus as viewed from the laser scanner coordinate system {L} in the control cycle at k-th time, r1 represents the X-axis radius of the weaving locus, r2 represents the Y-axis radius of the weaving locus, and Ok represents the rotation angle of the welding point Mk in the control cycle at k-th time.

According to this embodiment, as hereinabove described, the focus calculation portion 27 acquires the position $^L$Mk ($X_{Mk}$, $Y_{Mk}$) of the welding point Mk on the weaving locus in the control cycle at k-th time on the basis of the X-axis radius r1 of the weaving locus, the Y-axis radius r2 of the weaving locus, the position $^L$Ck ($X_{Ck}$, $Y_{Ck}$) of the center point of the weaving locus as viewed from the laser scanner coordinate system {L} in the control cycle at k-th time acquired on the basis of the welding speed V, and the rotation angle Ok of the welding point Mk in the control cycle at k-th time acquired on the basis of the frequency f of the weaving motion.

Figure 11:
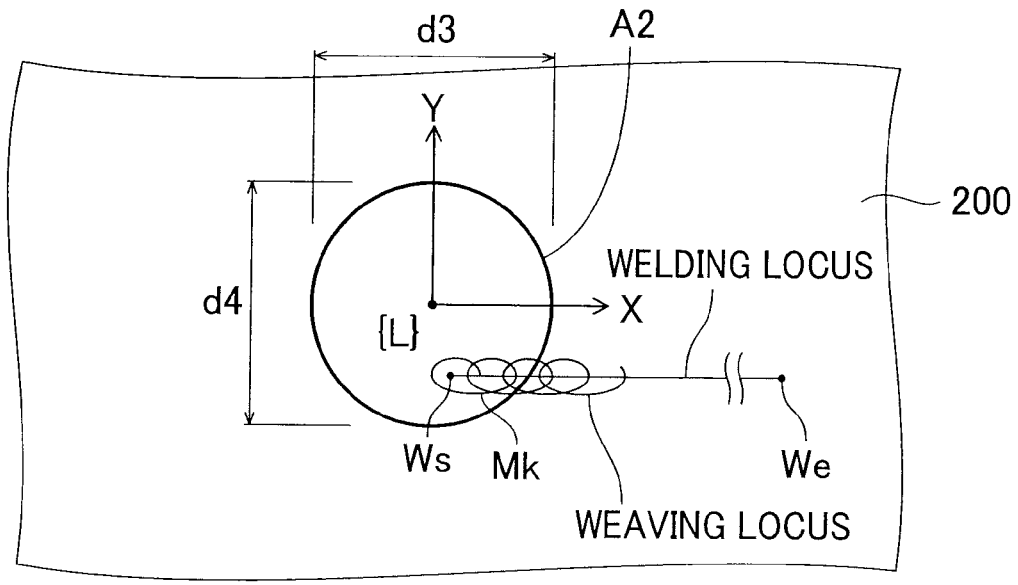
FIG. 11 is a diagram showing a welding range of the robot system according to the embodiment of the present invention.

After terminating processing for acquiring the position $^L$Mk of the welding point Mk on the weaving locus as viewed from the laser scanner coordinate system {L} in the control cycle at k-th time at the step S5 in FIG. 6, the focus calculation portion 27 determines whether or not the position $^L$Mk ($X_{Mk}$, $Y_{Mk}$) of the welding point Mk on the weaving locus as viewed from the laser scanner coordinate system {L} in the control cycle at k-th time is in a welding range A2 (see FIGS. 11 and 12) at a step S6. The user sets values of an X-axis diameter d3 and a Y-axis diameter d4 of a circle or an ellipse centered around the origin of the laser scanner coordinate system {L} to determine the welding range A2, as shown in FIG. 11. The user can freely set the X-axis diameter d3 and the Y-axis diameter d4. However, similarly to the X-axis diameter d1 and the Y-axis diameter d2 of the welding start range A1, if too large diameters are set as the X-axis diameter d3 and the Y-axis diameter d4, a laser beam is emitted to a great distance from the laser scanner 4, and hence a maximum settable value of each diameter is set to 200 mm. In this embodiment, the X-axis diameter d3 and the Y-axis diameter d4 both are set to 200 mm, for example. In other words, the welding range A2 is set to be larger than the welding start range A1 (the X-axis diameter and the Y-axis diameter both are 180 mm) of the laser scanner 4. The X-axis diameter d3 and the Y-axis diameter d4 may be equal to or different from each other. In other words, the welding range A2 is set to be substantially circular or substantially elliptic. The welding range A2 is moved in association with the movement of the laser scanner 4 by the robot 1.

Next, an expression for determining whether or not the position $^L$Mk ($X_{Mk}$, $Y_{Mk}$) of the welding point Mk on the weaving locus as viewed from the laser scanner coordinate system {L} in the control cycle at k-th time is in the welding range A2 is shown as the following expression (10). The expression (10) is calculated through a procedure similar to the case of the aforementioned expression (2-5).

$$4(X_{Mk}^2/d3^2 + Y_{Mk}^2/d4^2) \leq 1 \qquad (10)$$

In the aforementioned expression (10), $X_{Mk}$ represents the X-coordinate of the welding point Mk on the weaving locus as viewed from the laser scanner coordinate system {L} in the control cycle at k-th time, $Y_{Mk}$ represents the Y-coordinate of the welding point Mk on the weaving locus as viewed from the laser scanner coordinate system {L} in the control cycle at k-th time, d3 represents the X-axis diameter of the welding range A2, and d4 represents the Y-axis diameter of the welding range A2.

Figure 12:
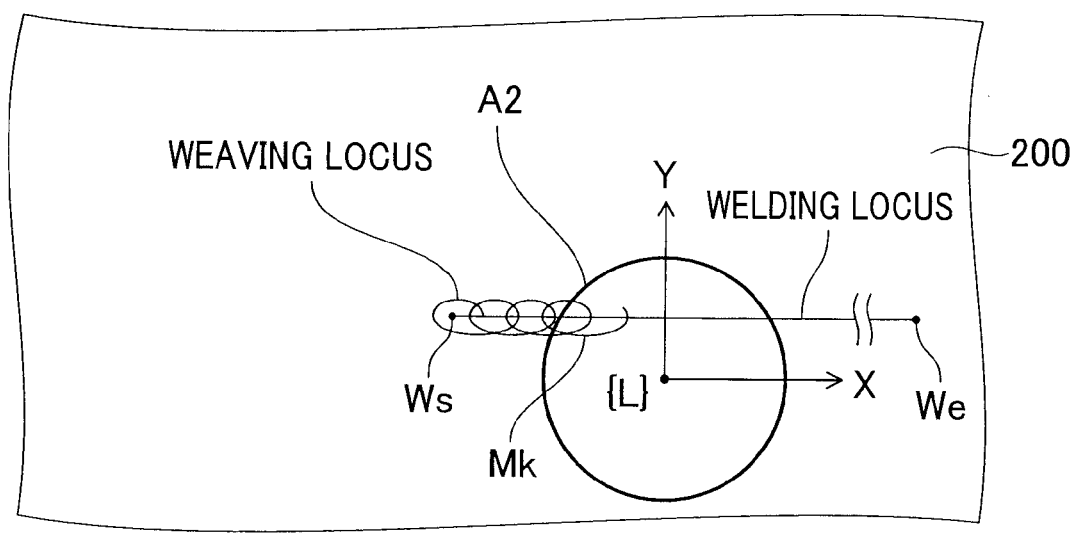
FIG. 12 is a diagram showing a state where the welding point is located in the welding range of the robot system according to the embodiment of the present invention.

At a step S7, the focus calculation portion 27 controls the laser scanner 4 to emit a laser beam to the welding point Mk in the control cycle at k-th time if the position $^L$Mk ($X_{Mk}$, $Y_{Mk}$) of the welding point Mk on the weaving locus as viewed from the laser scanner coordinate system {L} in the control cycle at k-th time is in the welding range A2, as shown in FIGS. 11 and 12. On the other hand, the focus calculation portion 27 advances to a step S8 without emitting a laser beam if the position $^L$Mk ($X_{Mk}$, $Y_{Mk}$) of the welding point Mk on the weaving locus as viewed from the laser scanner coordinate system {L} in the control cycle at k-th time is not in the welding range A2. Thus, the laser scanner 4 can be inhibited from emitting a laser beam to an improper position. If the position $^L$Mk ($X_{Mk}$, $Y_{Mk}$) of the welding point Mk on the weaving locus as viewed from the laser scanner coordinate system {L} in the control cycle at k-th time does not enter the welding range A2 and welding with weaving cannot be properly performed on a desired welding locus, a relation between a movement locus (movement path) of the laser scanner 4 moved by the robot 1 and the welding information (information regarding a welding speed, a welding locus, and the shape of a weaving locus) is improper, and hence proper welding can be performed by resetting the relation between this movement locus and the welding information.

At the step S8, the focus calculation portion 27 determines whether or not k is equal to N, and terminates the processing for welding with weaving if k is equal to N. If k is not equal to N (k<N), the focus calculation portion 27 increments k at a step S9 to repeat the steps S4 to S9 until k becomes equal to N. In the robot system 100 according to this embodiment, the position $^L$Mk of the welding point Mk on the weaving locus corresponding to the current position and posture $^R_L$T of the laser scanner 4 is acquired to determine whether or not to emit a laser beam at every control cycle of the robot 1, and hence the movement speed of the laser scanner 4 does not depend on the welding speed V, dissimilarly to a case where the position and posture of the laser scanner 4 at the start of laser beam emission and the position and posture of the laser scanner 4 at the end of laser beam emission are previously set.

Figure 13:
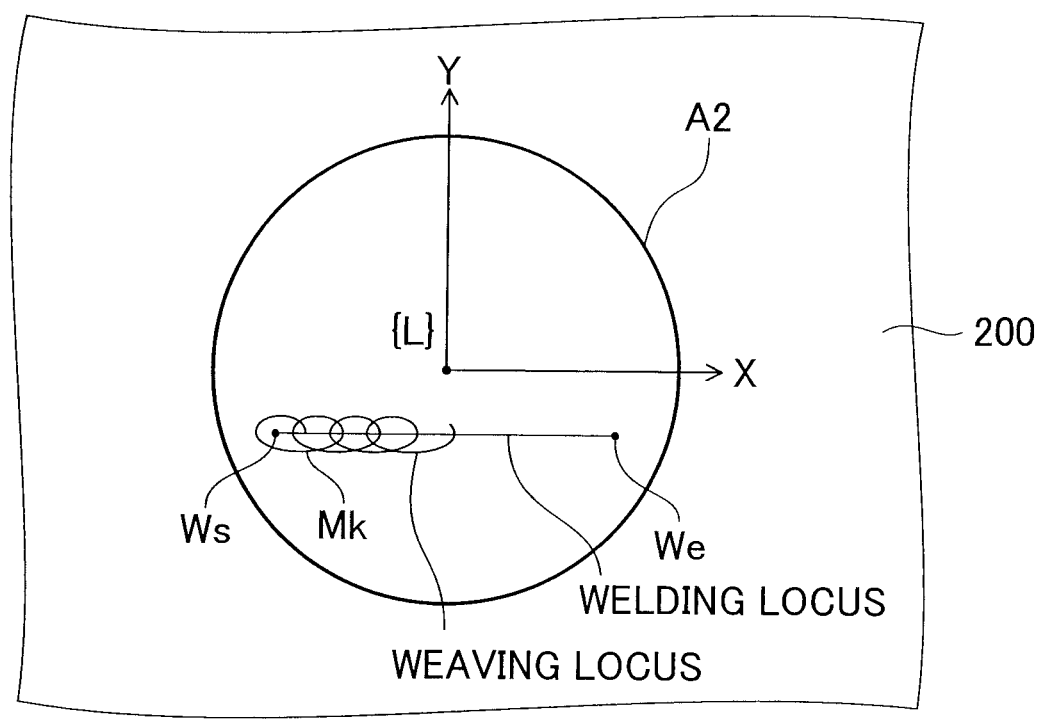
FIG. 13 is a diagram showing a state where all welding points on a weaving locus are located in the welding range of the robot system according to the embodiment of the present invention.

In other words, in the robot system 100 according to this embodiment, welding with substantially circular or substantially elliptic weaving continued on the welding locus can be performed while the galvanometer mirror 42 scans the welding locus with a laser beam on the basis of the position $^L$Mk of the welding point Mk on the weaving locus acquired by the focus calculation portion 27 as long as the welding point on the weaving locus is in the welding range A2, as shown in FIG. 13, even if the laser scanner 4 is not moving. If the laser scanner 4 is moving, the position of the laser scanner 4 may be simply adjusted by the operations of the robot 1 such that the position $^L$Mk ($X_{Mk}$, $Y_{Mk}$) of the welding point Mk on the weaving locus as viewed from the laser scanner coordinate system {L} in the control cycle at k-th time is located in the welding range A2, and the laser scanner 4 may not be moved along the welding locus. Therefore, in the robot system 100 according to this embodiment, the galvanometer mirror 42 can scan the welding locus with a laser beam in order to perform welding with substantially circular or substantially elliptic weaving continued on the welding locus, regardless of the movement locus of the laser scanner 4.

According to this embodiment, as hereinabove described, the robot system 100 is provided with the focus calculation portion 27 controlling the laser scanner 4 to scan the welding locus with a laser beam in order to perform welding with weaving performed on the welding locus in a state where the laser scanner 4 is not moving, whereby the laser scanner 4 that is not moving scans the welding locus with a laser beam in order to perform welding with weaving performed on the welding locus, and hence welding with weaving on the welding locus can be performed even in a state where the laser scanner 4 is not moving.

According to this embodiment, as hereinabove described, the focus calculation portion 27 is so formed as to perform control to perform welding with substantially circular or substantially elliptic weaving continued on the welding locus in a state where the laser scanner 4 is not moving. According to this structure, welding can be performed while a desired weld width is secured on the welding locus due to the substantially circular or substantially elliptic weaving locus continuously formed.

According to this embodiment, as hereinabove described, the pendant 3 is so formed as to accept the X-axis radius r1 and the Y-axis radius r2 of the weaving locus, the welding speed V (movement speed of the center point of the weaving locus), and the frequency f of the weaving motion as information regarding the shape of the weaving locus substantially circularly or substantially elliptically formed from the user, and the focus calculation portion 27 is so formed as to acquire the position $^L$Mk ($X_{Mk}$, $Y_{Mk}$) of the welding point Mk on the substantially circular or substantially elliptic weaving locus on the basis of the information regarding the shape of the weaving locus accepted by the pendant 3. According to this structure, the user can arbitrarily determine the shape of the weaving locus by setting the X-axis radius r1, the Y-axis radius r2, the welding speed V, and the frequency f, and hence the robot system 100 having a high degree of freedom for weld design can be provided.

According to this embodiment, as hereinabove described, the focus calculation portion 27 acquires the position $^L$Mk ($X_{Mk}$, $Y_{Mk}$) of the welding point Mk on the weaving locus in the control cycle at k-th time on the basis of the X-axis radius r1 of the weaving locus, the Y-axis radius r2 of the weaving locus, the position $^L$Ck ($X_{Ck}$, $Y_{Ck}$) of the center point of the weaving locus as viewed from the laser scanner coordinate system {L} in the control cycle at k-th time acquired on the basis of the welding speed V, and the rotation angle θk of the welding point Mk in the control cycle at k-th time acquired on the basis of the frequency f of the weaving motion. According to this structure, the position $^L$Mk ($X_{Mk}$, $Y_{Mk}$) of the welding point Mk on the weaving locus can be reliably acquired, and hence welding with weaving on the welding locus can be reliably performed.

According to this embodiment, as hereinabove described, the focus calculation portion 27 is so formed as to perform control to perform welding with substantially circular or substantially elliptic weaving continued on the welding locus while the center point of the substantially circular or substantially elliptic weaving locus is located on the welding locus in a state where the laser scanner 4 is not moving. According to this structure, welding can be performed in a desired weld width taking the welding locus as its central axis.

According to this embodiment, as hereinabove described, the focus calculation portion 27 is so formed as to determine whether or not the welding point Mk on the weaving locus is located in the welding range A2 to which the laser scanner 4 can emit a laser beam in a state where the laser scanner 4 is not moving, and control the laser scanner 4 to scan the welding point Mk with a laser beam if the welding point Mk is located in the welding range A2. According to this structure, a laser beam is not emitted if the welding point Mk is not located in the welding range A2, and hence the laser scanner 4 can be inhibited from emitting a laser beam to an improper position by emitting the laser beam despite the welding point Mk to which the laser beam cannot be emitted from the current position and posture $^R_L$T of the laser scanner 4.

According to this embodiment, as hereinabove described, the focus calculation portion 27 transforms the position $^R$Ck of the center point of the weaving locus and the current position $^R_L$T of the laser scanner 4 both as viewed from the robot coordinate system {R} into the position $^L$Ck of the center point of the weaving locus and the current position $(^R_L T)^{-1}$ of the laser scanner 4 both as viewed from the laser scanner coordinate system {L}, and thereafter determines whether or not the welding point $^L$Mk on the weaving locus acquired with the position $^L$Ck of the center point of the weaving locus into which the position $^R$Ck of the center point of the weaving locus is transformed is located in the welding range A2. Then, the focus calculation portion 27 controls the laser scanner 4 to scan the welding point $^L$Mk with a laser beam if the welding point $^L$Mk on the weaving locus is located in the welding range A2. Thus, the robot system 100 can determine whether or not the welding point $^L$Mk on the weaving locus is located in the welding range A2 on the basis of the position of the laser scanner 4 in motion, and hence the focus calculation portion 27 can easily perform control processing based on operations of the laser scanner 4.

According to this embodiment, as hereinabove described, the focus calculation portion 27 is so formed as to determine whether or not the starting point Ws serving as the reference position of the welding locus is located in the welding start range A1 of the laser scanner 4 when the laser scanner 4 is moving, and start determining whether or not the welding point Mk on the weaving locus is located in the welding range A2 if the starting point Ws is in the welding start range A1. According to this structure, the focus calculation portion 27 starts determining whether or not the welding point Mk is located in the welding range A2 of the laser scanner 4 when the starting point Ws of the welding locus enters the welding start range A1 of the laser scanner 4, and hence an unnecessary control operation for determining whether or not the welding point Mk is in the welding range A2 despite the fact that the laser scanner 4 is located a great distance from the welding locus can be inhibited to reduce the load on the focus calculation portion 27.

According to this embodiment, as hereinabove described, the welding start range A1 (the X-axis diameter and the Y-axis diameter both are 180 mm) of the laser scanner 4 is set to be smaller than the welding range A2 (the X-axis diameter and the Y-axis diameter both are 200 mm) to which a laser beam can be emitted. Thus, the welding start range A1 having an area smaller than that of the welding range A2 can be employed to move the laser scanner 4 until the starting point Ws previously enters the welding start range A1. Therefore, the welding range A2 having a relatively large area can be employed to reliably capture a plurality of welding points Mk continuously when welding is actually performed, and hence welding corresponding to the weaving locus or an arbitrarily-shaped welding locus can be reliably performed.

According to this embodiment, as hereinabove described, the welding start range A1 and the welding range A2 are moved in association with the movement of the laser scanner 4 by the robot 1. Thus, the welding start range A1 can be moved to a position where the starting point Ws of the welding locus enters the welding start range A1 by moving the laser scanner 4 even if the starting point Ws of the welding locus is not in the welding start range A1, and the welding range A2 can be moved to a position where the welding point Mk on the weaving locus enters the welding range A2 by moving the laser scanner 4 even if the welding point Mk on the weaving locus is not in the welding range A2. Consequently, continuous welding can be reliably performed with the laser scanner 4.

According to this embodiment, as hereinabove described, the welding start range A1 and the welding range A2 are set to substantially circular or substantially elliptic. Thus, whether or not the starting point Ws of the welding locus is located in the welding start range A1 and whether or not the welding point Mk on the weaving locus is located in the welding range A2 can be easily determined, as compared with a case where the welding start range A1 and the welding range A2 are set to be polygonal.

According to this embodiment, as hereinabove described, the galvanometer mirror 42 to scan the welding locus with a laser beam is provided on the laser scanner 4, and the mirrors 42a and 42b of the galvanometer mirror 42 are driven to scan a prescribed position with a laser beam in a state where the laser scanner 4 is not moving, whereby welding with weaving on the welding locus is performed while the galvanometer mirror 42 scans the welding locus with a laser beam. According to this structure, the laser scanner 4 can easily scan the welding locus with a laser beam by driving the galvanometer mirror 42 without moving the laser scanner 4, and hence welding with weaving on the welding locus can be easily performed without moving the laser scanner 4.

According to this embodiment, as hereinabove described, the position $^{L}$Mk of the welding point Mk on the weaving locus corresponding to the current position and posture $^{R}_{L}$T of the laser scanner 4 is acquired to determine whether or not to emit a laser beam at every control cycle of the robot 1. According to this structure, the laser scanner 4 may not be controlled to be moved to match the movement speed of the laser scanner 4 to the welding speed V, and hence the robot 1 mounted with the laser scanner 4 can be easily controlled.

According to this embodiment, as hereinabove described, the user selects the interpolation type with the pendant 3, and teaches the starting point Ws and the end point We of the welding locus to the robot control apparatus 2 with the pendant 3. Furthermore, the focus calculation portion 27 is so formed as to set the locus information of welding D on the basis of the starting point Ws and the end point We of the welding locus and the interpolation type, and acquire the welding point Mk on the weaving locus on the basis of the set locus information of welding D. According to this structure, the locus information of welding D can be clearly set on the basis of the starting point Ws and the end point We of the welding locus and the interpolation type, and hence the welding point Mk on the weaving locus can be reliably acquired.

According to this embodiment, as hereinabove described, the robot 1 includes the plurality of servomotors to drive each joint, and the laser scanner 4 mounted on the end portion can be moved by each servomotor. According to this structure, the laser scanner 4 mounted on the end portion of the robot 1 can be easily moved to a prescribed position by moving a plurality of joints of the robot 1 individually.

Although the present invention has been described and illustrated in detail, it is clearly understood that the same is by way of illustration and example only and is not to be taken by way of limitation, the spirit and scope of the present invention being limited only by the terms of the appended claims.

For example, while the robot system is so formed as to perform welding with weaving on the welding locus both in a state where the laser scanner serving as the laser emitting portion in the present invention is not moving and a state where the laser scanner is moving in the aforementioned embodiment, the present invention is not restricted to this. In the present invention, the robot system may be so formed as not to be capable of performing welding with weaving on the welding locus in a state where the laser scanner is moving (the laser scanner may be fixedly set) as long as the same is so formed as to perform welding with weaving on the welding locus at least in a state where the laser scanner is not moving.

While the focus calculation portion serving as the control portion in the present invention is so formed as to perform control to perform welding with substantially circular or substantially elliptic weaving in the aforementioned embodiment, the present invention is not restricted to this. In the present invention, the control portion may be so formed as to perform control to perform welding with weaving such as linear weaving, other than substantially circular or substantially elliptic weaving, on the welding locus, for example.

While the straight-line interpolation is selected to perform welding with weaving on the straight-line welding locus in the aforementioned embodiment, the present invention is not restricted to this. In the present invention, welding with weaving on a welding locus such as a circular welding locus, an elliptic welding locus, or an arbitrarily-shaped welding locus obtained by combining a circular arc, an ellipse, and a straight line, other than the straight-line welding locus may be performed similarly to the aforementioned embodiment.

While the processing performed by the focus calculation portion serving as the control portion is described with the flow-driven flowchart in which processing is performed in order along the lines of a processing flow for convenience of description in the aforementioned embodiment, the present invention is not restricted to this. In the present invention, the processing performed by the control portion may be event-driven processing performed on a one-event basis. In this case, the processing performed by the control portion may be completely event-driven processing or a combination of event-driven processing and flow-driven processing.

What is claimed is:

1. A robot system comprising:
   a robot;
   a laser emitting portion moved by said robot, capable of scanning a welding locus with a laser beam at least in a state where said laser emitting portion is not moving; and
   a control portion controlling said laser emitting portion to scan said welding locus with said laser beam in order to perform welding with weaving on said welding locus at least in the state where said laser emitting portion is not moving, wherein
   said control portion is so formed as to determine whether or not a reference position of said welding locus is located in a prescribed range of said laser emitting portion when said laser emitting portion is moving and start determining whether or not said welding point on a weaving locus is located in said welding range if said reference position is in said prescribed range.

2. The robot system according to claim 1. wherein
   said control portion is so formed as to perform control to perform welding with substantially circular or substantially elliptic weaving continued on said welding locus at least in the state where said laser emitting portion is not moving.

3. The robot system according to claim 1. further comprising an acceptance portion accepting information regarding a shape of said weaving locus from a user, wherein
   said control portion is so formed as to acquire positional information of a welding point on said weaving locus corresponding to said welding locus on the basis of said information regarding said shape of said weaving locus accepted by said acceptance portion.

4. The robot system according to claim 3, wherein
   said acceptance portion accepts information of a first axis radius and a second axis radius that is orthogonal to said first axis radius, of said weaving locus, information of a movement speed of a center point of said weaving locus, and information of a frequency of weaving motion as said information regarding said shape of said weaving locus substantially circularly or substantially elliptically formed from the user, and said control portion is so formed as to acquire said positional information of said welding point on substantially circular or substantially elliptic said weaving locus corresponding to said welding locus on the basis of said information regarding said shape of said weaving locus accepted by said acceptance portion.

5. The robot system according to claim 4, wherein said control portion is so formed as to acquire said positional information of said welding point on substantially circular or substantially elliptic said weaving locus corresponding to said welding locus on the basis of positional information of said center point of said weaving locus acquired on the basis of said information of said movement speed of said center point of said weaving locus, a rotation angle of said weaving locus acquired on the basis of said information of said frequency of said weaving motion, and said information of said first axis radius and said second axis radius of said weaving locus.

6. The robot system according to claim 4, wherein said control portion is so formed as to perform control to perform welding with substantially circular or substantially elliptic weaving continued on said welding locus while said center point of substantially circular or substantially elliptic said weaving locus is located on said welding locus at least in the state where said laser emitting portion is not moving.

7. The robot system according to claim 3, wherein said control portion is so formed as to determine whether or not said welding point on said weaving locus corresponding to said welding locus is located in a welding range to which said laser beam can be emitted from said laser emitting portion at least in the state where said laser emitting portion is not moving, and control said laser emitting portion to scan said welding point with said laser beam if said welding point is located in said welding range.

8. The robot system according to claim 7, wherein said laser emitting portion is so formed as to be moved by said robot on the basis of a first coordinate system based on said robot, and said control portion is so formed as to determine whether or not said welding point on said weaving locus corresponding to said welding locus is located in said welding range on the basis of a second coordinate system based on said laser emitting portion different from said first coordinate system at least in the state where said laser emitting portion is not moving, and control said laser emitting portion to scan said welding point with said laser beam if said welding point is located in said welding range.

9. The robot system according to claim 8, wherein said control portion is so formed as to transform positional information of a center point of said weaving locus and information of a current position of said laser emitting portion both defined on the basis of said first coordinate system into positional information of said center point of said weaving locus and information of said current position of said laser emitting portion both defined on the basis of said second coordinate system based on said current position of said laser emitting portion, and thereafter determine whether or not said welding point on said weaving locus corresponding to said welding locus is located in said welding range using said positional information of said center point of said weaving locus and said information of said current position of said laser emitting portion both defined on the basis of said second coordinate system, and control said laser emitting portion to scan said welding point with said laser beam if said welding point is located in said welding range.

10. The robot system according to claim 1, wherein said reference position of said welding locus is a stalling point of said welding locus.

11. The robot system according to claim 1, wherein, said prescribed range of said laser emitting portion is set to be smaller than said welding range.

12. The robot system according to claim 1, wherein said prescribed range of said laser emitting portion and said welding, range are moved in association with movement of said laser emitting portion by said robot.

13. The robot system according to claim 1, wherein said prescribed range Of said laser emitting portion and said welding range are set to be substantially circular or substantially elliptic.

14. The robot system according to claim 1, wherein said laser emitting portion includes a mirror portion to scan said welding locus with said laser beam, and said mirror portion scans said welding locus with said laser beam to perform welding with weaving on said welding locus at least in the state Where said laser emitting portion is not moving.

15. The robot system according to claim 14, wherein said mirror portion is so formed as to be capable of scanning a prescribed position with said laser beam.

16. The robot system according to claim 3, wherein said acceptance portion includes a teaching apparatus to teach an operation of said robot, and said information regarding said shape of said weaving locus is acquired on the basis of the user operation of said teaching apparatus.

17. The robot system according to claim 3, wherein said control portion is so formed as to acquire said positional information of said welding point on said weaving locus corresponding to said welding locus at every control cycle of said robot.

18. The robot system according to claim 3, wherein said acceptance portion is so formed as to accept information regarding a starting point and an end point of said welding locus and an interpolation type of said welding locus from the user, and said control portion is so formed as to set said welding locus on the basis of said starting point and said end point of said welding locus and said interpolation type of said welding locus accepted by said acceptance portion, and acquire said positional information of said welding point on said weaving locus corresponding to set said welding locus.

19. The robot system according to claim 1, wherein said robot includes a plurality of joints and a plurality of driving portions to drive each of said plurality of joints, said laser emitting portion is mounted on an end portion of said robot, and said laser emitting portion is so formed as to be movable by driving said plurality of joints of said robot.

\* \* \* \* \*